March 28, 1961 W. J. ZENNER 2,977,180

AUTOMATIC PRIMING DEVICE

Filed Jan. 8, 1959

INVENTOR.
WALTER J. ZENNER
BY Thomas E. Dorn
ATTY.

2,977,180

AUTOMATIC PRIMING DEVICE

Walter J. Zenner, Des Plaines, Ill., assignor to Peter G. S. Mero, Chicago, Ill.

Filed Jan. 8, 1959, Ser. No. 785,743

3 Claims. (Cl. 346—140)

This invention relates to a new and improved recording device. More particularly, the invention relates to a recording device suitable for use in a graphic communication system of the kind in which graphic or written data is written manually, or otherwise originated, at one station of the system, and is automatically reproduced at another station.

In graphic communication systems, a message, chart, sketch, or other data is transcribed upon a writing surface at one station of the system and is automatically reproduced at a second or receiver station in the system. Usually, the initial transcription is accomplished manually. In order to transmit the information necessary for reproduction at the receiver, the transmitter is provided with a suitable apparatus for analyzing movements of the transmitter stylus or other recording device and for developing electrical control signals representative of those movements. A preferred system of this kind is described in United States Patent No. 2,583,535 of Robert Adler, issued January 29, 1952, and in United States Patent No. 2,649,503 of Robert Adler, issued August 18, 1953.

In systems of this kind, where liquid ink is utilized as the recording medium, some difficulty may be encountered in obtaining a free and even flow of the ink, particularly when recording is initiated. For example, the ink may tend to clog to some extent in the pen of the transmitting or recording stations or may simply fail to flow at the beginning of the recording operation. This is particularly true in view of the fact that it is frequently desirable to utilize an ink supply which is spaced by some distance from the recording stylus or pen and is connected thereto by a relatively small, thin tube. An arrangement of this kind may be adopted in order to avoid imposing excessive weight upon the linkage which drives the recording pen and because of other factors in the construction of the communication system receiver.

A principal object of the invention, therefore, is a new and improved recording device for a graphic communication system which assures an adequate ink supply at all times in operation of a system transmitter or receiver.

A more specific object of the invention is a new and improved automatic priming device for the ink supply of a receiver in a graphic communication system.

A particular object of the invention is a new and improved automatic priming arrangement for a graphic recording device utilizing liquid ink and in which the recording stylus or pen is connected to an ink supply through a relatively long conduit.

Other and further objects of the present invention will be apparent from the following description and claims and are illustrated in the accompanying drawings which, by way of illustration, show a preferred embodiment of the present invention and the principles thereof and what is now considered to be the best mode for applying those principles. Other embodiments of the invention embodying the same or equivalent principles may be used and structural changes may be made as desired by those skilled in the art without departing from the present invention and the purview of the appended claims.

Figure 1:
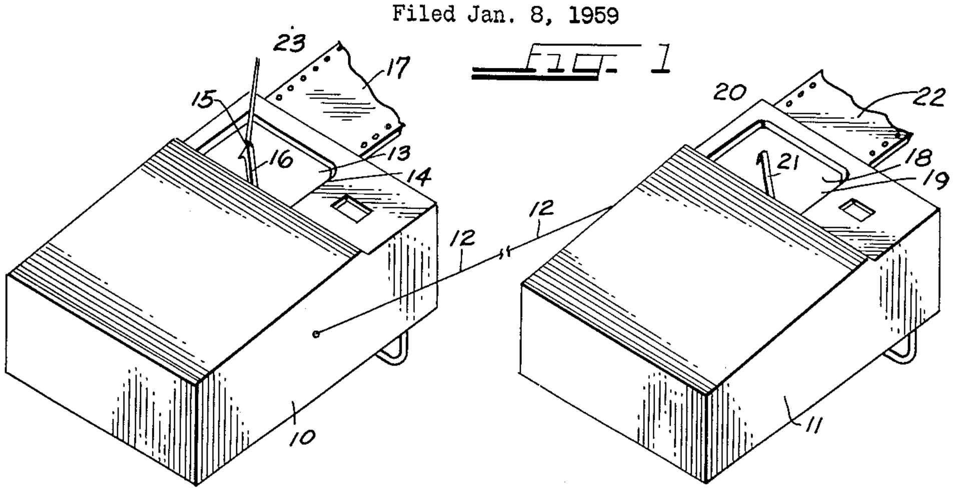
Fig. 1 is a simplified perspective view of a graphic communication system in which the recording device of the invention may be employed.

The graphic communication system illustrated in Fig. 1 comprises two communication stations 10 and 11 which are electrically connected or otherwise coupled to each other as by a transmission line 12. It should be understood that a radio transmission link or other coupling arrangement may be substituted for the transmission line 12. The two stations 10 and 11 may both be transceivers; that is, each station may be adapted to operate as either a transmitter or a receiver.

The communicattion station 10 includes a writing surface 13 which is bounded by a frame 14; in operation, a suitable recording medium 17, usually paper, may be disposed upon the writing surface 13. The station 10 further includes a writing head or stylus 15 which is supported upon an arm or link 16 which constitutes a part of the transceiver apparatus. Preferably, the arm 16 comprises one member of a parallel linkage system in a translating apparatus of the kind described in the aforementioned United States Patent No. 2,583,535 of Robert Adler.

The communication station 11 is essentially similar in construction to station 10 and includes a writing surface 18 which is bounded by a frame 19. As in the case of station 10, the writing surface 18 may be utilized to support a suitable recording medium 22 in position to be engaged by a writing head or stylus 20. The stylus 20 is mounted upon a support arm or link 21 which comprises one member of a translating mechanism similar to that utilized in station 10. The two communication units 10 and 11 each further include suitable electrical circuits for translating movements of the styli 15 and 20 into electrical control signals which may be transmitted over the line 12. In addition, each of the stations includes circuits and devices for moving the styli into and out of engagement with their associated writing surfaces and for moving the styli transversely of those surfaces to reproduce information thereon in response to the control signals transmitted over the line 12. These circuits and devices may be of known construction, particularly that described in the aforementioned Adler patents and therefore need not be set forth specifically herein.

To facilitate description of the operation of the graphic communication system of Fig. 1, it may be assumed that station 10 is utilized as a transmitter and station 11 is employed as a receiver for a given communication. For this purpose, a stylus actuator 23 is utilized, in conjunction with the stylus 15, to afford a convenient means for manipulation of that sylus. With the actuator 23 in position, the transmitter operator is able to write a message or other data to be transmitted upon the recording medium supported upon writing surface 13. The consequent movements of the stylus 15 into and out of engagement with the writing surface 13 and across that surface are translated into electrical control signals by the mechanism and electrical circuits connected to link 16.

These control signals are transmitted to the station 11 and are utilized therein to drive the link 21 and cause the stylus 20 to transcribe the same message or data upon the recording medium supported upon writing surface 18.

When the recording media on writing surfaces 13 and 18 are filled, or when a further message or additional data are to be transmitted, the stylus 15 may be driven to a predetermined position on the writing surface 13. This particular movement of the stylus may be utilized to actuate a mechanism which changes the recording medium at both stations of the system; a paper feed control apparatus of this kind is described and claimed in United States Patent No. 2,621,249 to T. I. Ress, issued December 9, 1952. The two units 10 and 11 may also be reversed in operation, making unit 11 the transmitter and station 10 the receiver. For this purpose, the actuator 23 is removed from its engagement with the stylus 15 and a similar actuator is utilized to drive the stylus 20 of station 11. It may also be necessary to change certain of the electrical circuits and connections within the two stations of the communication system to condition them for the change in function; suitable switching apparatus may of course be provided for this purpose.

On the other hand, the unit 10 may be constructed for transmitter operation only, with the actuator 23 permanently mounted on the stylus 15; the unit 11 may be constructed for receiver operation only, if desired.

Figures 2, 3:
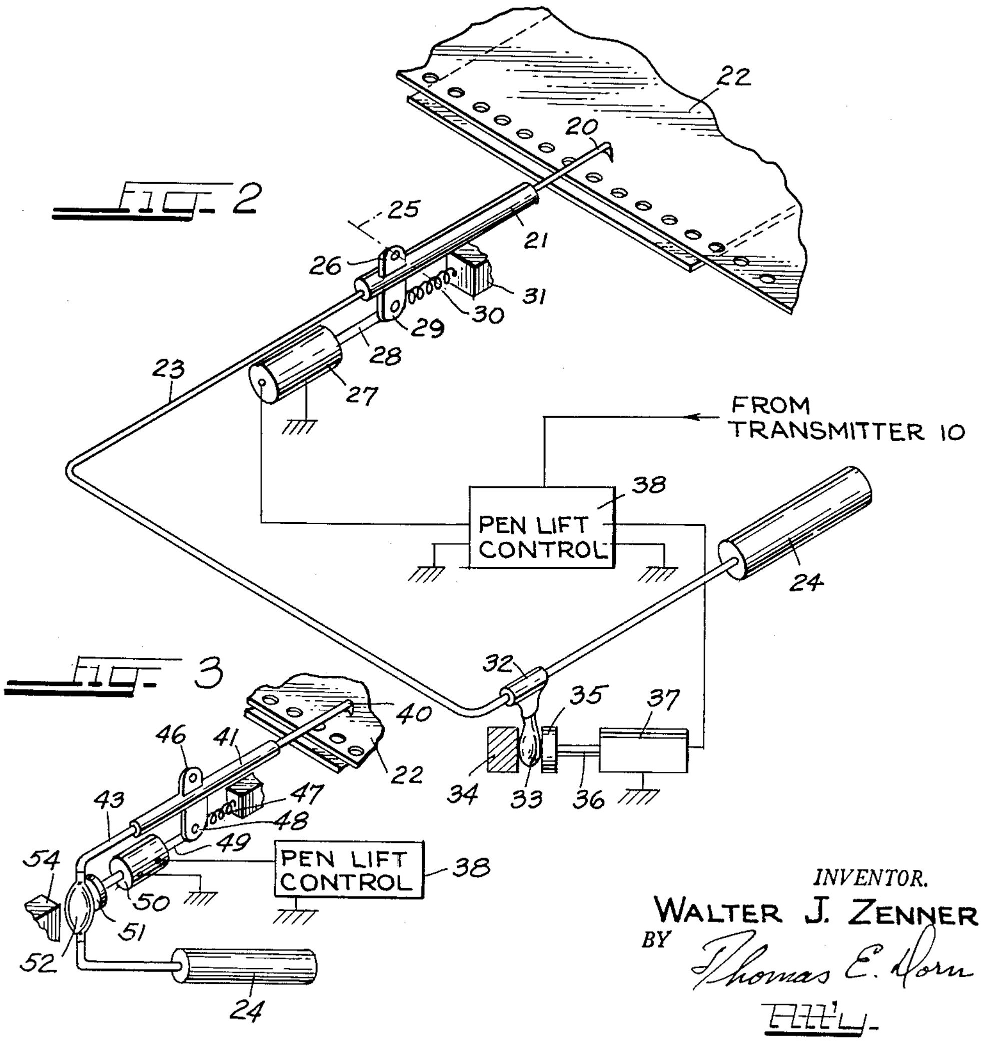
Fig. 2 is a partially schematic perspective view of one embodiment of a recording device constructed in accordance with the present invention.
Fig. 3 is a detail view showing a modified construction which may be employed in practicing the invention.

Fig. 2 illustrates a recording device which includes an automatic priming arrangement constructed in accordance with the present invention. As indicated therein, the stylus 20 may be connected to a flexible tube 23 of relatively small diameter which extends through the support arm 21 or is otherwise mounted thereon and which is connected to an ink source or reservoir 24. In the illustrated arrangement, the arm 21 is mounted for pivotal movement about an axis 25 by suitable means such as the member 26; the particular mounting arrangement is not critical and may be varied in accordance with the requirement of the drive linkage selected for the arm 21. Pivotal movement of the arm 21 to bring the stylus 20 into and out of engagement with the paper or recording base 22 is controlled by a solenoid 27. The armature 28 of the solenoid is pivotally connected to a lug 29 on the pen arm 21. The lug 29 is also connected to a biasing spring 30, the other end of the spring being anchored to a fixed member 31 which may constitute a part of the chassis or frame of the receiver station 11.

A T-fitting 32 is interposed in the conduit 33 between the pen or stylus 20 and the ink reservoir 24. This fitting connects the conduit to a relatively small variable volume chamber comprising a sac or bladder 33. The bladder 33 is disposed between a fixed member 34 and a plunger element 35, the plunger element being mounted on the armature 36 of a second soleonid 37, the solenoid 37 being electrically connected to a pen lift control circuit 38. The control circuit 38 is also electrically connected to the pen lift solenoid 27 and is itself controlled by electrical signals received from the transmitter 10 (see Fig. 1).

Operation of the automatic priming device and recording arrangement illustrated in Fig. 2 is extremely simple yet highly advantageous in a communication system of the kind described hereinabove. When the system is placed in operation, it is necessary that the transmitter 10 generate some kind of electrical signal to notify the receiver 11 that the receiver recording pen 20 must be brought into contact with the paper or other recording base 22. It is this signal which is supplied to the pen lift control circuit 38. The received signal is utilized by the control circuit to develop a suitable actuating signal which energizes the pen lift solenoid 27 and actuates the solenoid to pivot the pen arm 21 in a clockwise direction, as seen in Fig. 2, bringing the stylus or pen member 20 into contact with the paper 22. At the same time, the pen lift actuating signal is also supplied to the solenoid 37. The consequent energization of the solenoid 37 causes the plunger element 35 to squeze the bladder 33, reducing its volume and forcing a controlled amount of ink out of the bladder. A portion of this ink may be forced back into the reservoir 24, but, by the same token, part of the ink is forced through the remaining portion of the conduit 23 and out to the pen 20. In this manner, the pen is automatically primed.

During the given transmission period, the pen 20 may be engaged and disengaged with the paper 22 a number of times. Each time the pen starts a marking operation, it is effectively primed, with the result that each mark starts exactly at the time intended, with no time delay between contact of the pen and paper and the flow of ink to the paper.

Bladder 33 should be made relatively small in order to avoid ink blots on the paper 22. On the other hand, since some of the ink is driven back into the reservoir 24, the bladder should not be made too small. It is not possible to postulate exactly the size of the bladder for any given receiver construction, since the optimum size is dependent upon the length of the conduit 23, the diameter of the conduit, the nature of the ink supply 24, the flow characteristics of the ink, and numerous other factors. On the other hand, the bladder size may be determined without substantial difficulty on an empirical basis.

Of course, the automatic priming ararngement of Fig. 2 may be applied to a transceiver arrangement as well as to a receiver. In a construction of this kind, with the unit operating as a transmitter and the pen manually controlled, the circuit normally employed for generating the pen-lift signal may be utilized to control the solenoid 37 and supply the desired automatic priming effect.

Fig. 3 illustrates a somewhat modified arrangement in which only one solenoid is employed for both the pen lift and priming operations. The illustrated apparatus includes a pen or stylus 40 which corresponds to the stylus 20 and extends through the pen arm 41, being connected to a relatively small flexible ink conduit 43 which, in turn, is connected to the ink supply 24. As before, the pen arm 41 may be pivotally mounted, by means such as the mounting element 46, for movement into and out of contact with the paper 22. Moreover, and as in the previous described construction, a biasing spring 47 may be employed normally to maintain the pen 40 out of contact with the paper, the spring 47 being connected to a lug or lever 48 on the pen arm 41.

In this construction, the lever 48 is connected to one end of the armature 49 of a pen lift and primer solenoid 50. The end of armature 49 opposite the lever 48 carries a plunger element 51 which corresponds to the previously described plunger element 35. In this instance, plunger element 51 is aligned with a relatively small bladder 52 that is interposed directly in the ink conduit 43.

In operation of the embodiment of Fig. 3 a suitable pen lift actuation signal from the control circuit 38 is supplied to the solenoid 50 when the pen 40 is to be brought into contact with the paper 22. Energization of the solenoid 50 pivots the arm 41 in a clockwise direction to engage the pen with the paper. The same movement of the solenoid armature also squeezes the bladder 52 between the plunger element 51 and the fixed element 54. Thus, the single solenoid 50 performs the same function as both solenoids 27 and 37 in the arrangement of Fig. 2 and comprises both the moving means for engaging the pen 40 with the recording base 22 and the means for squeezing the bladder 52 to prime the pen. In all other respects, the operation of the two devices may be substantially similar.

The construction illustrated in Fig. 3 may also be applied to a transceiver, and is particularly useful in this regard. Thus, in a transceiver, the solenoid 50 would be maintained in inactive condition during use as a transmitter, since movement of the stylus during transmission is externally controlled. However, the pivotal movements of the pen support arm 41 occasioned by movement of the stylus during transmission cause longitudinal movement of the solenoid armature, moving the plunger element 51 into contact with the bladder 52 each time the pen 40 contacts the paper 22 and thus effectively priming the pen without requiring electrical control of the priming apparatus.

Of course, other variations in the ink supply and priming apparatus of the invention may be utilized. For example, although the bladders 33 and 52 represent preferred forms of the variable volume chamber utilized in the apparatus, a simple piston and cylinder arrangement may be employed if desired. Moreover, the apparatus may be applied to a recording device in which the paper or other recording base is moved into engagement with the pen equally as easily as it is applied to moving pen devices of the kind described in detail herein.

Hence, while the preferred embodiments of the invention have been illustrated and described, it is to be understood that these are capable of variation and modification and I therefore do not wish to be limited to the precise details set forth, but desire to avail myself of such changes and alterations as fall within the purview of the following claims.

I claim:

1. In a recording device for a graphic communication system station of the kind including a pen, electrically actuated means for moving said pen and a recording base relative to each other to engage and disengage said pen and said recording base, and control means for applying an electrical actuating signal to said moving means, an ink feed and priming apparatus comprising: an ink conduit connecting said pen to a source of liquid ink; a variable volume chamber connected to said ink conduit intermediate said pen and said ink source and filled with ink from said ink source; and electrically actuated means, connected to said control means, for reducing the volume of said chamber and forcing a predetermined limited quantity of ink through said conduit in response to said electrical actuating signal each time said moving means is actuated to engage said pen and said recording base without otherwise affecting the normal flow of ink from said ink source though said conduit to said pen, said variable volume chamber being refilled with ink from said source each time said electrically actuated means is deactivated to permit said chamber to return to its initial volume.

2. In a recording device for a graphic communication system station of the kind including a pen, electrically actuated means for moving said pen relative to a recording base to engage and disengage said pen and said recording base, and control means for applying an electrical actuating signal to said moving means, an ink feed and priming apparatus comprising: an ink conduit connecting said pen to a source of liquid ink; a flexible bladder connected to said ink conduit intermediate said pen and said ink source and filled with ink from said ink source; and electrically actuated means, comprising a solenoid electrically connected to said control means and an armature disposed within and extending from said solenoid in alignment with said bladder, for squeezing said bladder and forcing a predetermined limited quantity of ink through said conduit in response to said electrical actuating signal each time said moving means is actuated to engage said pen and said recording base without otherwise affecting the normal flow of ink from said ink source through said conduit to said pen, said bladder being refilled from said ink source each time said solenoid is deenergized.

3. An ink feeding and priming apparatus of the kind described in claim 2 in which said solenoid and armature comprise the principal operating members in said pen moving means.

References Cited in the file of this patent

UNITED STATES PATENTS

| | | |
|---|---|---|
| 1,635,977 | Ranger | July 12, 1927 |
| 1,901,673 | Sleeper | Mar. 14, 1933 |
| 2,820,689 | Holloway | Jan. 21, 1958 |

FOREIGN PATENTS

| | | |
|---|---|---|
| 753,407 | France | Aug. 7, 1933 |
| 554,308 | Great Britain | June 29, 1943 |
| 733,826 | Great Britain | July 20, 1955 |